United States Patent [19]

Hyde

[11] Patent Number: 4,838,598
[45] Date of Patent: Jun. 13, 1989

[54] SEGMENTED END GATE FOR BOX TYPE VEHICLE BODIES

[76] Inventor: Neal T. Hyde, P.O. Box 278, Lodgepole, Nebr. 69149

[21] Appl. No.: 180,354

[22] Filed: Apr. 11, 1988

[51] Int. Cl.$^4$ .............................................. B62D 25/00
[52] U.S. Cl. ...................................... 296/50; 296/52; 49/360; 49/507; 222/561
[58] Field of Search ............... 296/50, 51, 52; 49/360, 49/507; 160/224; 222/561, 565

[56] References Cited

U.S. PATENT DOCUMENTS

| | | | |
|---|---|---|---|
| 1,579,603 | 4/1926 | Etienne | 296/52 |
| 1,710,944 | 4/1929 | Olsen | 296/50 |
| 2,997,213 | 8/1961 | Richards et al. | 296/50 |
| 4,067,466 | 1/1978 | Parks et al. | 296/50 |
| 4,186,958 | 2/1980 | Welch | 296/50 |

*Primary Examiner*—Robert R. Song

[57] ABSTRACT

To provide flow of grain controlled in amount and direction, an end gate for a truck comprises an end gate body adapted to be fastened to the end panel of a truck having three vertically slidable door panels in it and a single lever operated drive plate. Each of the door panels includes a separate latch by which it is connected to the drive plate. The door panels are mounted in parallel track members with cut-away portions and a member extending upwardly from the bottom edge of the door panel when the door panel is in its uppermost position to hold the lower portion of the door panels. The latches include hinges movable from a location over an L-shaped flange on the longitudinally extending drive plate and away from said longitudinally extending plate and the latch cam may be moved to engage the hinge and press it against said longitudinally extending plate for connecting said drive means to said door panel.

9 Claims, 6 Drawing Sheets

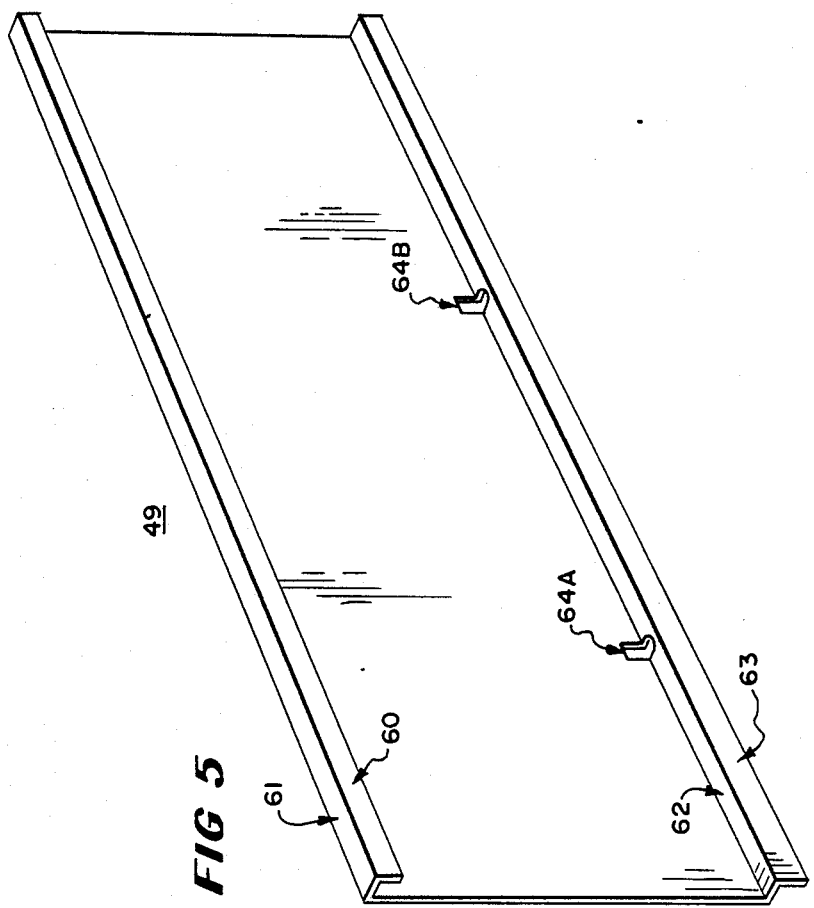

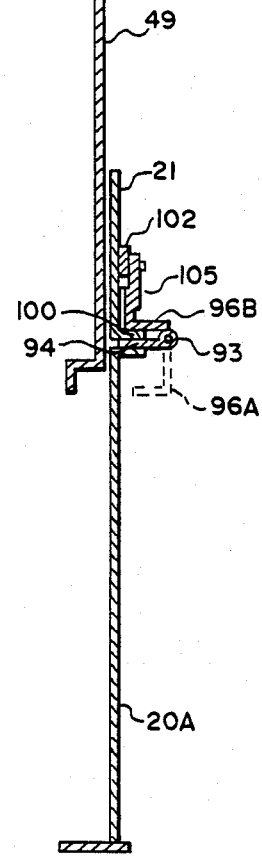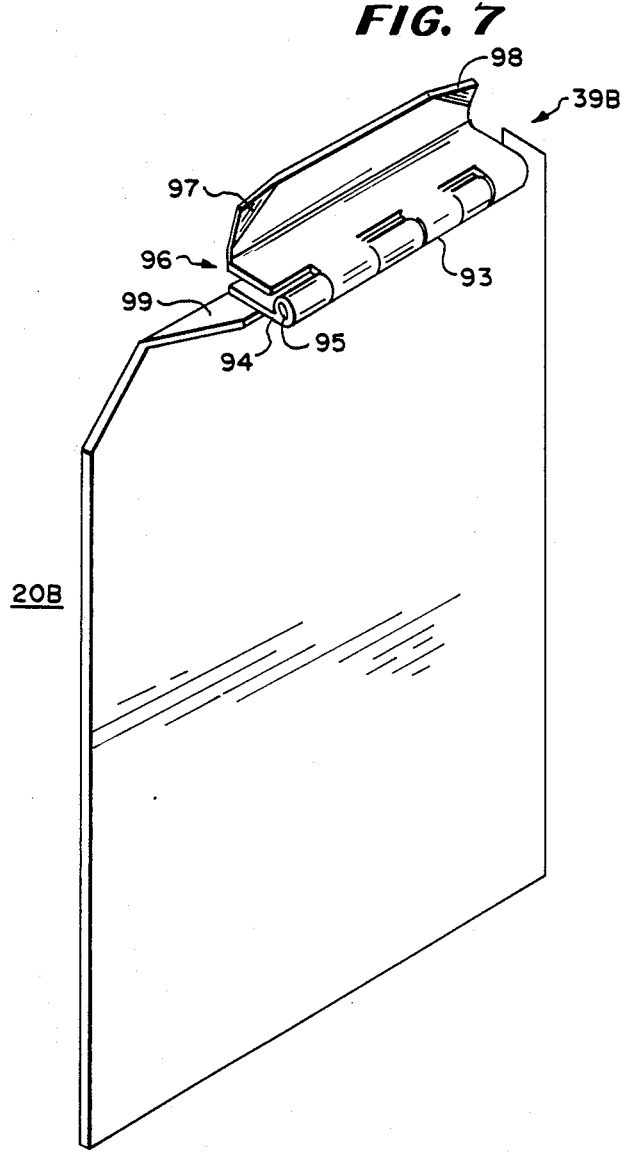

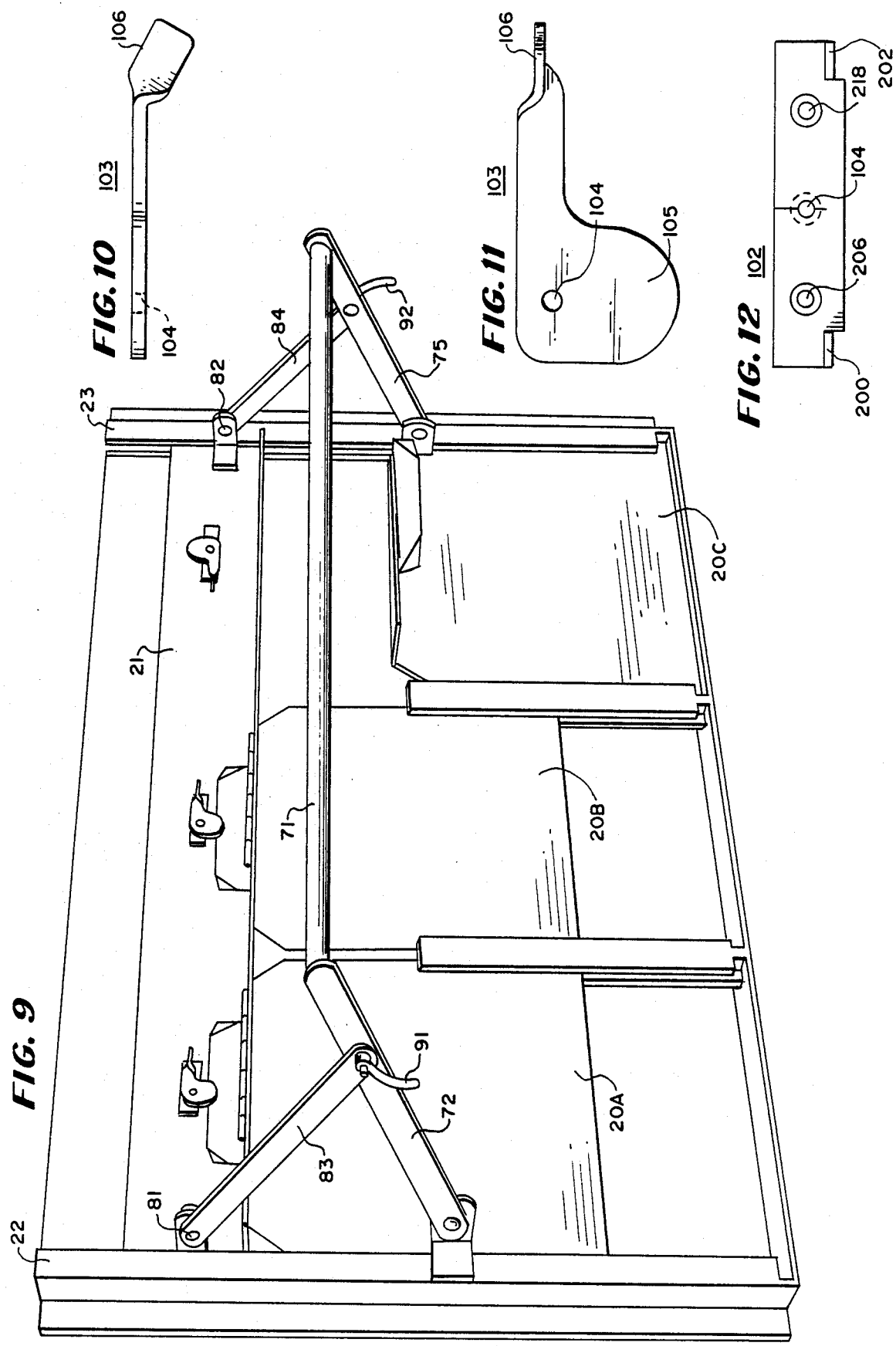

SEGMENTED END GATE FOR BOX TYPE VEHICLE BODIES

BACKGROUND OF THE INVENTION

This invention relates to truck end gates.

One type of farm truck has a box type vehicle body for transporting grain or other fluent granular materials. It is usually provided with a hoist that can raise and lower the front end of the box to assist the unloading of grain through a central discharge opening in the rear wall of the box. The discharge of grain is controlled by a door, typically called an end gate, located in the central discharge opening.

In some end gates, a sliding door is guided by a pair of vertical tracks and is opened and closed by a lever system that transfers the rotational force of an opening handle into a vertical movement of the sliding plate. Variations of this basic system are shown in U.S. Pat. Nos. 2,258,203 and 2,635,688. These systems have several disadvantages, such as for example: (1) they are either too large for on-the-farm auger use or too small for rapid dumping at a large storage facility; and (2) they do not enable the load to be directed in its flow path nor to be balanced by drawing off the grain selectively from portions of the truck bed.

Some such grain trucks have an end gate opening that is wide such as between 30 inches to 36 inches. These wide end gates work well when unloading quickly into a large pit at a commercial grain company. For unloading on the farm, however, it is desirable at times to have a narrowed or directional flow from the end gate. Relatively small grain augers or conveyors are often used to elevate grain from the dump truck into storage areas and some means is usually used to direct the grain flow to the intake end of the auger.

In one prior art method of unloading grain on the farm, the grain is unloaded directly from the wide end gate. In this method, the truck is backed into axial alignment with the auger with the end gate opening squarely centered over the intake end of the auger. The grain is then unloaded directly into the auger intake.

This method of unloading has a disadvantage in that if the truck is off to the left or right an excess of grain flows one way or the other which can cause spillage and loss. Even if the truck is positioned correctly, a wide end gate opening causes the grain to spread out over a greater area than desired while unloading and results in the inefficient transfer of grain. The most efficient way to unload grain is to dump the grain into the intake of the auger in a narrow flow pattern.

One prior art solution to this problem uses shovels or other devices positioned at angles to force the grain to flow directly into the end of the auger. Also, boards or other objects may be jammed into the outer edges of the end gate opening in an attempt to block off part of the grain flow. These makeshift procedures have the disadvantage of being wasteful of time and being inefficient.

In some prior art equipment, for correcting the problems with end gates in unloading, metal chutes or hoppers such as those shown in U.S. Pat. Nos. 2,670,108; 2,678,121 and 3,090,527 are attached below the end gate opening and confine the grain flow toward the center.

This type of equipment has several disadvantages such as: (1) the chutes can make contact with the intake end of the auger when the box is tilted up and damage the auger flighting or the chute itself, thus limiting the height to which the grain box can be raised and the effectiveness of the dumping process; and (2) because the chutes are designed to restrict grain flow, they slow down the unloading process at commercial grain companies unless removed.

Another common method of confining grain flow is to provide a small hole in the center of the wide single gate and to attach a small sliding plate and track assembly to the outside surface of the gate to control flow from the smaller opening. This type of end gate is disclosed in U.S. Pat. No. 4,320,860. These small trap doors have a disadvantage of being hand-operated and tending to jam easily. They do not always provide the volume of grain flow desired because there is a limit to how big the opening can be made without weakening the structural strength of the larger sliding plate.

Some grain bodies are manufactured with an end gate that is fairly narrow in width. This can be an advantage when unloading into an auger but does not provide directional control. Smaller end gates can also be slow when dumping large loads at commercial grain companies. One such end gate is disclosed in U.S. Pat. No. 2,763,901.

There are several prior art end gates that provide directional control of grain flow from a central opening. Some such end gates have attachments that extend outwardly to direct the outward flow. Two such end gates are shown in U.S. Pat. Nos. 2,772,764 and 4,320,860. These end gates have disadvantages in that: (1) they do not permit leveling of a load that is initially unbalanced because the flow still originates from the center of the rear panel; and (2) they are subject to damage because of the extensions.

Segmented end gates are known for use with spreader boxes on gravel trucks. These end gates can level loads. Some such segmented end gates are disclosed in U.S. Pat. Nos. 2,258,842 and 2,850,216. This type of segmented end gate has the disadvantage of being complicated to use, expensive to manufacture and not suited for grain delivery.

SUMMARY OF THE INVENTION

Accordingly, it is an object of the invention to provide a novel end gate.

It is a further object of the invention to provide a novel end gate for grain trucks which controls the flow of grain to cause it to be deposited efficiently into an auger, thus preventing loss of grain by spillage and loss of time in unloading.

It is a still further object of the invention to provide a novel end gate which is simple in construction and easy to use.

It is a still further object of the invention to provide a novel end gate with a plurality of openings which may be easily selected and controlled to provide either rapid dumping or to permit narrowed directional flow of grain into an auger from different locations in the bed of a grain truck.

It is a still further object of the invention to provide a novel end gate which reduces unbalanced loads in the bed of the grain truck during unloading of the grain.

It is a still further object of the invention to provide a novel end gate having convenient latches for selecting openings at different locations through which the grain may flow toward the center of the grain box.

It is a still further object of the invention to provide a novel latch which is attractive, easy to use and provides positive locking features.

It is a still further object of the invention to provide a convenient and dependable drive means with latches and locking members for selectively opening gates.

In accordance with the above and further objects of the invention, a segmented end gate flow regulator is provided that eliminates end gate openings that are either too small or too large or which do not have directional control nor balancing features. The end gate regulator includes vertically sliding plates which control the discharge of grain from a central opening in the rear panel of the grain box and allows a greater degree of control over the width, direction, position and volume of grain flow than conventional end gates by permitting the selection of any of a plurality of gates to be opened.

The end gate regulates the outward flow of grain by a plurality of vertically sliding gate segments which are housed in a common framework. Each small gate segment can be operated singly or in combination with any or all of the other gate segments depending on whether or not they are latched to the single common drive plate. This drive plate is located above the smaller gates and runs in the exterior tracks of the basic end gate framework. Interior tracks are also built into the framework and in conjunction with the exterior tracks provides guideways for the individual gate segments.

All gate segments are opened and closed with a single operating handle which controls the raising and lowering of the drive plate in its tracks. This process is accomplished by a leverage system whereby the rotational movement of the operating handle is translated through connecting links into a vertical sliding movement of the drive plate. The operating handle is self-locking in the closed position and can be locked at intermediate heights by at least one friction means on either side of the handle or on both sides of the handle.

The drive plate and gate segments each have smaller perpendicular flanges which meet at their lower and upper extremes respectively. The drive plate has a set of latches for locking and unlocking the individual gate segments to it. Each gate segment has a hinge mechanism that works in conjunction with the latches for locking the opposing flanges of the drive plate and gate segments together. This connection provides a push-/pull relationship between the drive plate and gate segments.

Each latch consists of two pieces, which are: (1) a flat backpiece with a pivot hole and two stops bent outwardly; and (2) a flat cam lever with a pivot hole, a finger hold and an extending cam. The finger hold has a twist from vertical and is bent outwardly.

The cam lever moves from stop to stop through 180 degrees of pivoting motion about a pivot point to move the cam to a latching position or an unlatched position. It extends outwardly no more than ¾ inch so as to not interfere with the hinge motion. The cam lobe extends at least ¾ inch from the pivot point for firm locking and the stop is at least ¾ inch from the pivot point to prevent interference in the pivoting motion during which the cam must pass the stop. This allows clearance for a larger cam portion as it rotates from the closed to open position.

The end gate includes mounting flanges for mounting to existing trucks either to the existing tracks of an existing door in the end gate, if any, or by replacing the entire or a portion of the existing end gate. The operating handle is lockable in position by friction clutches to permit the door panels to be either partly opened or fully opened.

The end gate is: (1) easily attachable to the rear panel of conventional box type truck or wagon bodies; (2) retrofitted into original equipment having wide end gate openings by removing the wide single gate and fitting the mounting flanges of the end gate into the vacant tracks of the original single gate; or (3) retrofitted to a truck body with a narrow original gate. For such attachment or retrofitting, the original handle, narrow gate, and tracks are removed, a larger hole is created in the rear panel, and the end gate is directly mounted to the outside of the box. It can be used as a self-contained insert or add-on as described above that does not necessarily span the full height of the rear panel or it can be built as an integral part of the original equipment with minor modifications to the design.

In operation when unloading grain at a commercial grain company, all of the gate segments are opened simultaneously for rapid dumping. When unloading grain on the farm, the outward grain flow is usually narrowed by raising one or more gate segments which allows a more efficient transfer of grain to augers. The one or more gate segments are opened with the operating handle to the appropriate opening height and locked in position by tightening the friction members. By proper selection of the gate segments to be opened, grain flow is directed to the left or right of center to direct the flow if the truck is not positioned correctly with respect to the auger or to balance the load if it is unbalanced.

As can be understood from the above description, the end gate of this invention has several advantages such as: (1) it permits either rapid unloading from a grain truck at the grain company or slower unloading in a selected direction to an auger or the like on the farm; (2) it permits grain to be unloaded from different locations in the rear of the grain truck and thus can compensate for unbalanced loads that might otherwise damage the truck; (3) it can be retrofitted or attached to other trucks easily or included in the original equipment; and (4) it is simple in construction and economical.

It can also be understood from the above description that the latches used with the vertical sliding doors of this invention have several features which cause them to be superior latches, which features are: (1) they are attractive in appearance; (2) they are simple in construction and thus lower in cost; (3) they have a low profile that allows a greater space for the locking members to pass by the latch as it is opened and a greater depth for extending the cam portion during latching, thus permitting spacing between the two latched parts to be greater.

DESCRIPTION OF THE DRAWINGS

The above noted and other features of the invention will be better understood from the following detailed description when considered in connection with the accompanying drawings, in which:

FIG. 3 is a horizontal sectional view taken on line 3—3 of FIG. 2;

FIG. 4 is a vertical sectional view taken on line 4—4 of FIG. 2;

FIG. 5 is a front perspective view of the body panel;

FIG. 7 is a rear perspective view of the door panel and associated hinge mechanism;

FIG. 8 is a vertical sectional view taken on line 8—8 of FIG. 2;

FIG. 9 is a rear perspective view of the end gate showing a particular opening combination;

FIG. 10 is a plan view of a portion of a latch used in an embodiment of the invention;

FIG. 11 is an elevational view of the portion of the latch of FIG. 10; and

FIG. 12 is an elevational view of another portion of the latch of FIGS. 10 and 11.

DETAILED DESCRIPTION

Figure 1:
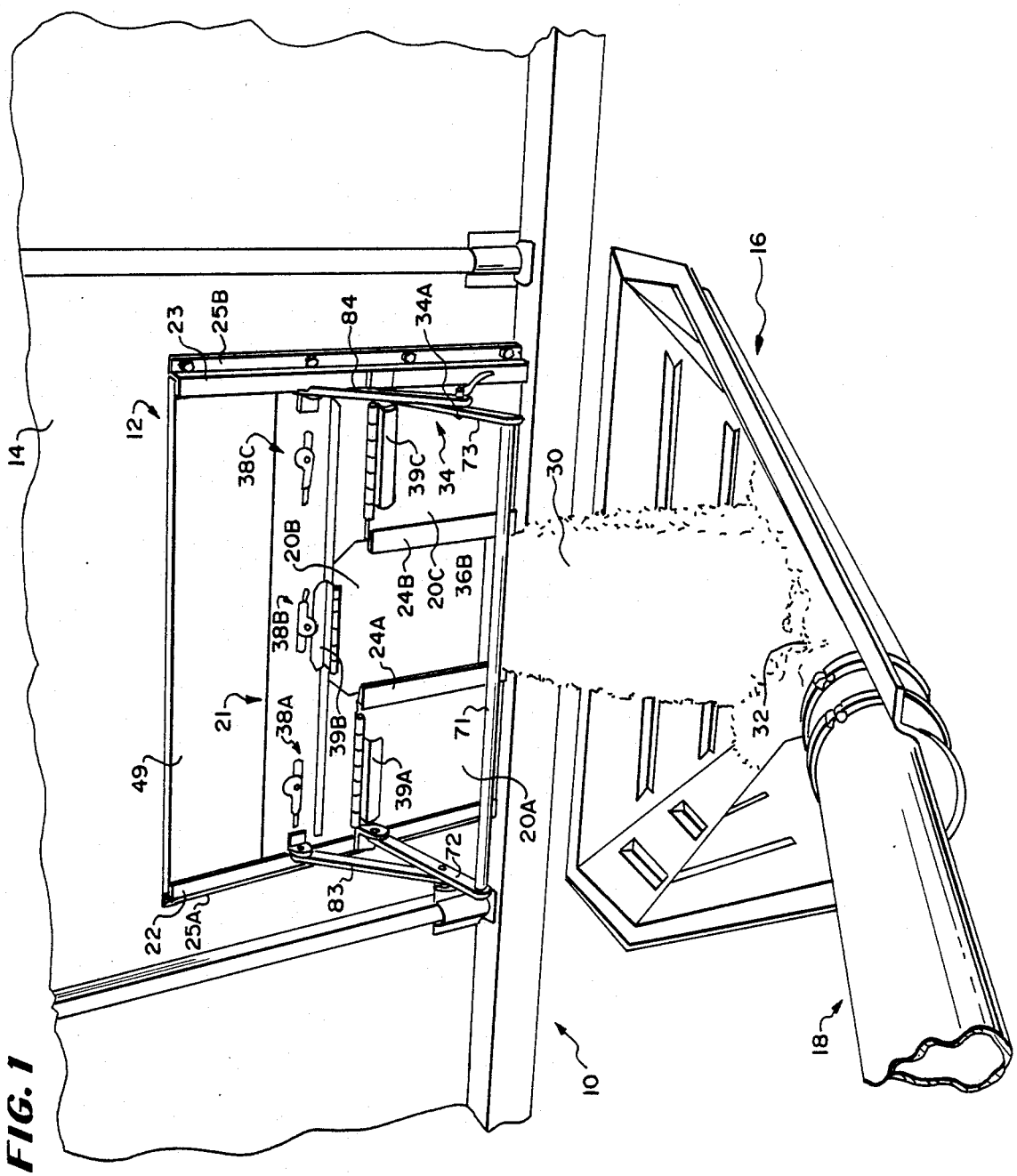
FIG. 1 is a fragmentary rear perspective view of the end gate of the invention in assembled and operating relationship with a dump truck and elevating device.

In FIG. 1, there is shown a portion of a dump truck 10, an end gate assembly 12, an end wall 14 for the dump truck 10, a material receiving hopper 16 and an elevating unit 18. This end gate assembly 12 may be used for controlling discharges of fluent granular materials 30 such as grain from a truck or wagon bed or a grain bin or other storage facility.

The end gate assembly 12 includes plural door panels 20A, 20B and 20C, a drive plate 21, a pair of opposed outer tracks 22 and 23 and a plurality of abbreviated inner tracks 24A and 24B. Each of the outer tracks 22 and 23 is comprised of a corresponding anchoring flange 25A and 25B that can be secured to a truck or wagon body by bolts or the like. Each outer track also has a corresponding guide flange 26A and 26B and an interconnecting off-set 27A and 27B (not shown in FIG. 1, shown in FIG. 3).

In FIG. 1, the end gate assembly 12 is shown mounted to the end wall 14 of a dump truck 10 in a central location near the bottom of the bed of the dump truck to control the flow of grain 30 into a hopper 16 for upward movement by an auger in a elevating mechanism 18. It flows into the auger tip 32 which is confined in a lower portion of the hopper 16 in a steady flow.

The end gate assembly 12 includes a manual operating lever system 34 which may be easily actuated by an operator to move the drive plate 21 upwardly or downwardly and to move selected ones of the panels 20A, 20B and 20C upwardly or downwardly with the drive plate and maintain the panels in place. In FIG. 1, the central door panel 20B is shown raised and connected to the drive plate 21 whereas the door panels 20A and 20C are closed and disconnected from the drive plate 21 so that the grain 30 only flows through the central aperture 36B formed by the raised door panel 20B in a central location.

To select the door panels that are to be raised and those that are to be lowered, a plurality of latches 38A, 38B and 38C are mounted to the drive plate 21 to be manually selected and activated in conjunction with the door panels so that as the drive plate 21 rises it lifts with it those door panels that are latched in place and when it is lowered, it lowers those panels latched in place. The unlatched panels remain to close the opening and prevent grain from flowing.

In the preferred embodiment, three door panels are utilized each having an area of 120 square inches. However, any number from between two and six door panels may be utilized and they may each have areas of between 25 square inches and 4 square feet. While a single manually operated drive plate is used in the preferred embodiment for convenience and the panel doors are selected to permit easy raising and lowering with the single operating lever system 34, a plurality of drive plates may be used instead of one drive plate and the drive plate or plates may be automatically operated instead of manually operated. Moreover, the panels may be opened part way if desired and locked in position by tightening nuts at joints such as that shown at 34A.

Figure 2:
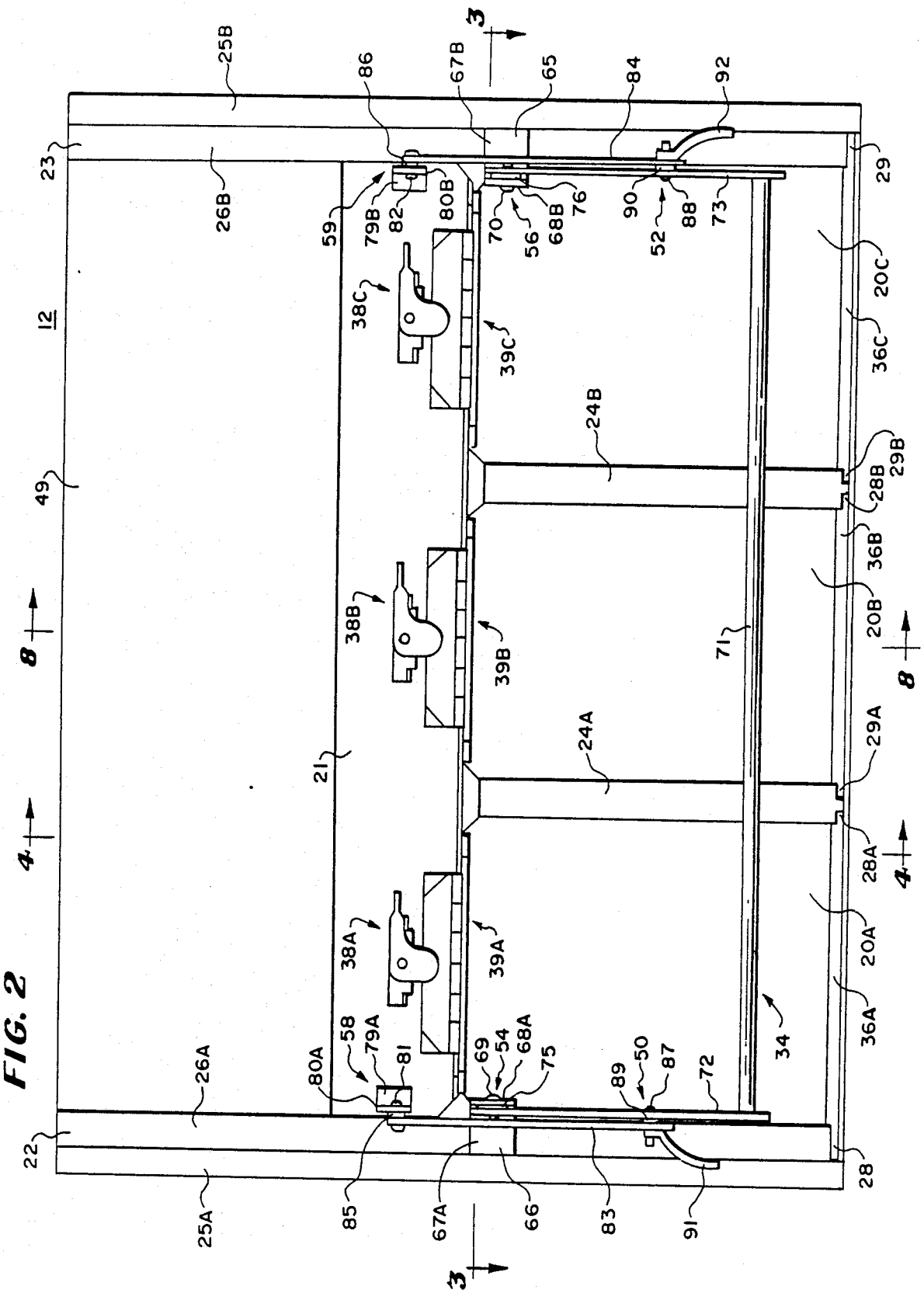
FIG. 2 is a rear elevational view of the end gate assembly, shown slightly opened.

In FIG. 2, there is shown an elevational view of the end gate assembly 12 with all three door panels 20A, 20B and 20C partly opened to form corresponding three openings 36A, 36B and 36C for grain.

To lock the door panels 20A, 20B and 20C to the drive plate 21, each of the panels has at its upper end a corresponding one of the fastening members 39A, 39B and 39C which are engageable with the corresponding latch assemblies 38A, 38B and 38C to form a connection between the drive plate 21 and the corresponding ones of the door panels 20A, 20B and 20C.

In the preferred embodiment, the latch assemblies 38A, 38B and 38C include a pivotable latch member and a back plate which cooperate with a longitudinal flange extending orthogonally outwardly from the bottom of the drive plate and with the fastening members 39A, 39B and 39C to form a lock. The fastening members 39A, 39B and 39C are hinged L-shaped plates which may be moved from a lower location to a location overlying the flange of the drive plate, in which position the latch assemblies 38A, 38B and 38C, may be moved downwardly to hold them in place and form a firm connection. However, other connections may be utilized such as connecting rods, linkages, pins or the like to form a connection between the three door panels 20A, 20B and 20C and the drive plate 21.

To move the drive plate 21 upwardly, the single operating-lever 34 includes a handle means 71, a first side arm 72, a second side arm 73, a first link 83, a second link 84, a first pivot point 50, a second pivot point 52, a third pivot point 54, a fourth pivot point 56, a fifth pivot point 58 and a sixth pivot point 59. The first and second pivot points 50 and 52 connect the first and second side arms 72 and 73 to the corresponding first and second linkages 83 and 84, respectively, the third and fourth pivot points 54 and 56 connect the first and second side arms 72 and 73 to the frame of the end gate and the fifth and sixth pivot points 58 and 59 pivotally connect the linkages 83 and 84 to the drive plate 21.

This mechanism forms a lever means which permits the drive plate 21 to be easily moved upwardly with mechanical advantage upon moving the handle means 71 upwardly and to move the drive plate 21 downwardly upon moving the handle downwardly. Used in connection with the latch assemblies and locking members, the drive plate 21 may lift selected ones of the three door panels 20A, 20B and 20C or lower them. Adjustable friction is provided in the first and second pivot points 50 and 52 so that the linkage may be moved to a location intermediate from its full downwardly position and its full upwardly position and it will stay of its own force to maintain selected door panels partly open if desired in the manner shown in FIG. 2.

To mount the end gate 12 to a back wall of a truck, anchoring flanges 25A, 25B are provided around the body portion 49 and the body portion 49 supports guides for the door panels 20A, 20B and 20C. Outer guide tracks 22 and 23 and inner tracks 24A and 24B are mounted to the body portion 49 in a manner to be described hereinafter.

The guide flanges 26A and 26B are in one plane and the anchoring flanges 25A, 25B are preferably in another parallel plane. The guide flanges 26A and 26B are provided with open notches 28 and 29 respectively at their lower extremes to prevent grain buildup that can otherwise occur when grain is trapped in a confined track. With this structure, grain, dirt or rust is forced downwardly out of the notches 28 and 29 by the door panels 20A and 20C as they close. Similarly, grain, rust and dirt are removed from the inner tracks 24A and 24B by the sliding action of the three door panels 20A, 20B and 20C.

A pair of angle brackets 65 and 66 (FIG. 2) are attached to the guide flanges of tracks 22 and 23. Each of the angle brackets 65 and 66 includes an anchor flange 67A or 67B (FIG. 2) which is secured preferably by welds to the guide flanges 26A and 26B and also includes perpendicularly extending flanges 68A and 68B. The extending flanges 68A and 68B of the angle brackets 65 and 66 are in parallel planes. Holes are provided in the angle brackets to support pivot pins 69 and 70. The pivots which may be in the form of headed rivets are axially aligned.

The pivot pins 69 and 70 support the handle means 71 and two generally parallel side arms 72 and 73. The parallel side arms are preferably constructed of strap iron and the connecting handle portion is preferably constructed of iron pipe or the like. Washers 75 and 76 are provided between flanges 68A and 68B and the upper extremes of the parallel side arms 72 and 73. The washers provide clearance between moving parts and reduce friction and wear.

Links 83 and 84 (FIG. 2) are connected by pivots 87 and 88 to parallel side arms 72 and 73 of handle 71. Pivots 87 and 88 are preferably in the form of a carriage-head bolt. The shank of the carriage-head bolt has a squared portion near the head that is approximately equal in thickness to that of the side arms 72 and 73. The square shank portions of pivots 87 and 88 fit into square holes provided in side arms 72 and 73. The pivots 87 and 88 therefore do not move relative to side arms 72 and 73. This keeps the bolt from turning when a nut is tightened on the other end to provide a frictional locking effect. Spacers 89 and 90 are provided between the side arms and links to provide clearance between links 83 and 84 and the heads of pivot pins 69 and 70 and to provide a parallel alignment of links 83 and 84 relative to the side arms 72 and 73. Handle nuts 91 and 92 or the like are provided on the threaded portion of pivots 87 and 88 for locking the relative positions of the side arms 72 and 73 and links 83 and 84 at a particular desired rotational position of the handle means 71 (FIG. 9) and associated height positions of the drive plate 21 and three door panels 20A, 20B and 20C.

In FIG. 3, there is shown a horizontal sectional view with the anchoring flanges 25A, 25B and body portion 49 of the end gate. As shown in this view, the left and right angle members 40A and 40B (FIG. 3) are attached preferably by welds to the innermost surfaces of corresponding ones of the left and right off-sets 27A and 27B and are spaced from the corresponding right and left guide flanges 26A and 26B such that vertical guideways 41A and 41B are provided for the three panels 20A, 20B and 20C and the drive plate 21 (FIGS. 1 and 2).

Plural inner tracks 24A and 24B (FIG. 2) are identical to one another and consist of corresponding dividing members 42A and 42B which are substantially T-shaped in cross-section with corresponding pairs of guide flanges 43A, 46A and 43B, 46B and corresponding stems 44A and 44B. Corresponding pairs of angle members 45A, 47A and 45B, 47B are attached preferably by welds to the opposite sides of the stem to provide vertical guideways for the three door panels 20A, 20B and 20C. The guide flanges 43A, 46A and 43B, 46B of the inner tracks are provided with notches 28A, 29A, 28B, and 29B (FIG. 2) at the lower extremes to prevent grain buildup.

The guide flanges and angle members provide guideways that are approximately twice the thickness of the three door panels 20A, 20B and 20C and drive plate 21. The lateral edges of the three door panels 20A, 20B and 20C and drive plate 21 are confined between the guide flanges and their associated angle members and the guideways are in parallel alignment. They allow vertical movement of the three door panels 20A, 20B and 20C and the drive plate 21.

As best shown in FIG. 4, the basic framework of the end gate assembly 12 comprises: (1) a bottom plate 48 (FIG. 2) to which the T member 42A (FIG. 3) and its associated angle members 43A and 45A are attached at the lower extremes preferably by welds; and (2) a body panel 49 (FIG. 4). Bends in the upper and lower extremities of the body panel provide members 60, 61, 62 and 63 which form a cross-section of sufficient structural strength to resist outward deflection due to internal grain pressure and the like.

The lateral edges of the body panel 49 are attached preferably by welds to the innermost corners of angle members (40A and 40B, FIG. 3). The relative positions of the exterior face of the body panel 49 and the exterior faces of angle members are such that clearance is provided between the drive plate 21 (FIGS. 1 and 2) and body panel 49. The same clearance is provided between the three door panels 20A, 20B and 20C and the body panel 49.

As best shown in FIG. 5, the lower cross section of the body panel 49 is provided with right angular slots 64A and 64B through which the upper rear portions of members 44A, 44B, 45A, 45B, 47A and 47B of inner tracks 24A and 24B (FIG. 3) pass. The upper extremes of the inner tracks are attached to the body panel 49 preferably by welding the protruding portions of members 44A, 44B, 45A, 45B, 47A and 47B to the body panel 49 at the intersection with the edges of the slots. However, any other convenient manner of attachment may be used.

Figure 6:
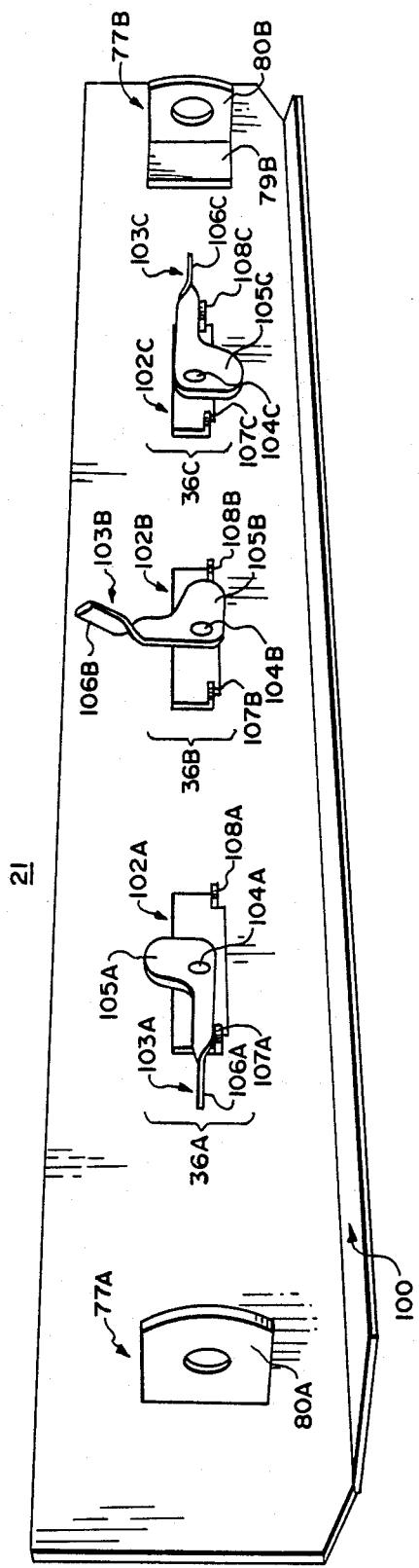
FIG. 6 is a rear perspective view of the drive plate and associated angle brackets and latch mechanisms.

In FIG. 6, there is shown a perspective view of the drive plate 21 having a flat main portion with a pair of opposed orthogonally extending angle brackets 77A and 77B, located near the lateral extremes of the drive plate 21. The angle brackets each include a corresponding one of two anchoring flanges 79A (not shown) and 79B secured to drive plate by welds and perpendicularly extending flanges 80A and 80B. The flanges 80A and 80B of the two brackets: (1) are arranged in parallel planes; and (2) have holes to accommodate pivots 81 and 82 (FIGS. 2 and 9) which may be in the form of headed rivets or the like. The axially aligned pivots 81 and 82 (FIG. 2) secure brackets 77A and 77B (FIG. 6) to links 83 and 84 (FIG. 2), which links 83 and 84 (FIG. 2) are preferably constructed of strap iron. Washers 85 and 86 (FIG. 2) are provided between flanges 80A and 80B and the upper extremes of links 83 and 84 (FIG. 2) to provide clearance between moving parts and to reduce friction and wear.

The drive plate 21 includes the latch assemblies 36A, 36B and 36C (FIG. 6) each of which cooperates with a different portion of the right angularly extending flange 100. Each latching mechanism is attached to the drive plate 21 preferably by welds and consists of two pieces, which are: (1) a flat backpiece with a pivot hole and two stops bent 90 degrees outward; and (2) a flat cam lever with a pivot hole, a finger hold and an extending cam. The finger hold has a 90 degree twist from vertical and is bent approximately 30 degrees outward.

More specifically each latch is comprised of corresponding ones of the three backing plates 102A–102C, handle members 103A–103C and pivots 104A–104C. The pivots are preferably in the form of headed rivets and are rigidly attached to the backing plates. The handle members consist of corresponding extending lobes 105A–105C and handle grips 106A–106C which have a 90 degree twist from vertical and are bent approximately 30 degrees away from the plane of the drive plate. This allows clearance between handle grip and drive plate 21 and provides a gripping surface for turning the latch.

The backing plates serve as spacers between the drive plate 21 and the extending lobe of the handle member. They are each provided with a corresponding one of the three pairs of perpendicularly extending stops 107A–107C and 108A–108C which limit the extreme positions of the latching mechanism.

Each cam lever moves from stop to stop through 180 degrees to move the cam without interference to and from a latching position. To provide firm latching the largest operative radius of the lobe of the cam is at least ¾ inch from the pivot point and the stop is at least ¾ inch from the pivot point and a longer distance than the maximum cam radius to permit the lobe to clear it. The handle is more than ¾ inch and a longer distance than the stop from the pivot point so it rests upon it in the unlatched position or latched position. The thickness of the cam and backpiece is less than ¾ inch and in the preferred embodiment is ¼ inch to avoid interference with other latch members such as the hinged members.

To provide clearance for the hinged latch member to swing in place, the latch is relatively flat and does not extend outwardly in the direction of the pivots such as 104A–104C by a distance more than ¾ of an inch. The distance between the pivot such as 104A–104C to the farthest part of the corresponding one of the lobes 105A–105C is at least ¾ inch to permit firm locking. The parts must be sufficiently strong to withstand high forces. The distance between the pivot and the closest stop should be at least as large as the distance between the pivot and the farthest part of the lobe to permit the lobe to pass and should be at least ¾ on an inch. In the preferred embodiment the distance between the pivot and the farthest part of the lobe and the distance to the stop is one and one-quarter inch.

In FIG. 7, there is shown a perspective view of one of the door panels 20B with its associated latch member 39B. Each of the three door panels 20A, 20B and 20C is the same and only one will be described herein. They are generally flat having a horizontal width along each of their bases of about 9.5 inches. This dimension should be at least 4.5 inches and no more than 19 inches and they should each have a vertical height of between 6 inches to 24 inches to provide an area of between 27 square inches and 456 square inches.

The panel 20B is provided with a latch member 39B, which in the preferred embodiment is a hinge mechanism having a fixed leaf 94 connected by pin 95 to a movable leaf 96. The movable leaf 96 is L-shaped in cross-section and is provided with outwardly extending corner grips 97 and 98, which are bent to provide space between them and the drive plate 21 (FIGS. 1, 2 and 6) for grasping with a finger when the movable portion has been moved against the drive plate for locking.

The fixed leaf 94 is attached preferably by welds to the right angularly extending flange 99 of the three door panels 20A, 20B and 20C. The movable leaf 96 in its uppermost position 96B (FIG. 8) rests above the right angularly extending flange 100 (FIG. 8) of drive plate 21.

As best shown in FIG. 8, in the closed position of the latch (FIG. 6), the extending lobe 105 of handle member 103 prevents the vertical portion of movable leaf 96 from swinging outwardly (FIG. 8). In this position, the flange 100 of the drive plate 21 (FIG. 6) is confined between the fixed leaf 94 and movable leaf 96 of hinge mechanism 93.

This arrangement provides a locking means between the drive plate 21 and the three door panels 20A, 20B and 20C (FIG. 2). An upward movement of the drive plate 21 causes the flange 100 to engage the horizontal portion of movable leaf 96B and provides an upward pull on the hinge mechanism and attached door panel. The lateral edges of the three door panels 20A, 20B and 20C and drive plate 21 are notched so that flanges 99 and 100 do not extend the full width of the door panels and drive plate 21. This allows the lateral edges of the three door panels 20A, 20B and 20C and drive plate 21 to run freely in the outer tracks 22 and 23 (FIGS. 1 and 2).

In the operation of the end gate illustrated best in FIG. 9, as the handle element 71 is moved in an upward arc from its closed position, it transfers force through links 83 and 84 to the drive plate 21 to move it upward vertically within the guideways of outer tracks 22 and 23. As the drive plate 21 moves upward, it opens the any of the door panels 20A, 20B and 20C if they are latched to the drive plate 21 in the manner described above.

If a latch is in the open position, the movable leaf 96 of the hinge mechanism is free to be moved to position 96A (FIG. 8) by grasping grips 97 or 98 (FIG. 7) and pulling in an outward and downward manner. Any door panel unlocked in this manner will close or remain closed irregardless of the vertical position of drive plate 21 and will allow no material to escape from that particular opening.

As handle element 71 is lowered from an elevated position, drive plate 21 moves downwardly and any doors attached to the drive plate 21 are lowered toward their closed positions. The handle assembly 34 is lockable by tightening the nut 91 and 92. The doors are self locking in the closed position due to the same basic principles described in U.S. Pat. No. 2,763,901 (column 3, lines 70–75 and column 4, lines 1–5 and 10–13).

In FIG. 10, there is shown a top view of a portion of any one of the latches 36A to 36C, which portion is handle member 103. The handle member 103 has a finger grip 106 twisted 30 degrees from the horizontal and a flat cam portion 105 adapted to be pivoted about a pivot point 104 (FIG. 11).

The top surface of the handle member 103 is relatively flat and in the preferred embodiment, is 3.44 inches from the outer limit of the cam portion 105 and the end of the handle, 2.31 inches being the distance between the handle and the end of the cam, that surface being flat.

In FIG. 11, the cam with an extending lobe is shown with the pivot point being upwardly located so that the lobe may extend a substantial distance downwardly and thus engage the remainder of the locking mechanism. In this embodiment, the lobe extends 1.56 inches downwardly and should extend within a range of ½ inch to 3 inches. Generally, it is made of steel plating 0.125 inches thick.

In FIG. 12, there is shown an elevational view of the back piece 102, also made of steel 0.125 inches thick and generally having in the preferred embodiment dimensions with a length of 3.25 inches and a width of 0.75 inches. The pivot point 104 is counter sunk in the back piece 102 at a central location in the preferred embodiment of 1.625 inches from each end. Two outwardly extending stop members extend in the direction of the cam member 103 as indicated at 200 and 202 with the stops being positioned to permit clearance between the pivot point 104 and the length of the cam member 106 to permit 180 degree rotation about the pivot point of the cam member 103 but to prevent the finger handle 106 from passing beyond the stops 200 or 202. In the embodiment of FIG. 12, two counter sunk holes 206 and 218 are utilized to permit fastening with heads flush against the surface of the back plate 102 to avoid impeding movement of the cam means 105 about the pivot point 104. In the preferred embodiment, the back plate is welded to the drive plate plate instead of using machine screws in countersunk holes. However, any convenient means for fastening may be used and different types of latches altogether may be used.

As can be understood from the above description, the end gate of this invention has several advantages such as: (1) it permits either rapid unloading from a grain truck at the grain company or slower unloading in a selected direction to an auger or the like on the farm and the truck may be converted from one method of unloading to the other quickly and easily; (2) it permits grain to be unloaded from different locations in the rear of the grain truck and thus can compensate for unbalanced loads that might otherwise damage the truck; (3) it can be retrofitted or attached to other trucks easily; and (4) it is simple in construction and economical.

Although a preferred embodiment of the invention has been described in some detail, many modifications and variations of the preferred embodiment can be made without deviating from the invention. Therefore, it is to be understood that, within the scope of the appended claims, the invention may be practiced other than as specifically described.

What is claimed is:

1. An end gate comprising:
 a body portion adapted to be fastened to the end panel of a truck;
 a plurality of door panels of between two and six in number each having a surface area of between 25 square inches and 4 square feet;
 each of said door panels located substantially in the same plane;
 drive means;
 means for selectively connecting any of said door panels to said drive means; and
 manually operable means for moving said drive means upwardly and downwardly whereby said door panels which are connected to said drive means are selectively moved upwardly to open a space for grain to flow therethrough or downwardly to close said space.

2. An end gate in accordance with claim 1 further including a plurality of vertical track members;
 said vertical track members having a cutaway lower portion;
 said door panels being mounted in parallel track members;
 some of said track members including a member extending upwardly above the bottom edge of the door panel when the door panel is in its uppermost position, whereby the lower portion of said door panels are held in place when said door panels are raised;
 the bottom portions of said track members being cut away wherein the downward movement of said door panels clears grain, rust and dirt from said tracks.

3. An end gate in accordance with claim 2 in which the means for selectively connecting door panels to the drive means includes an outwardly extending flange connected to said drive means;
 a corresponding first locking member connected to each corresponding one of said door panels;
 a corresponding latch means connected to said drive means for each of said door panels;
 said latch means and locking means being positioned with respect to said drive means to permit engagement about said extending flange in the locked position and disengagement in the unlocked position.

4. An end gate means in accordance with claim 3 in which said drive means is a longitudinally extending plate having latch means movable between a raised unlatched position and a downwardly extending latched position into close engagement with locking means on said panels;
 said corresponding locking means on said door panels being hinge means movable from a location over said longitudinally extending plate and away from said longitudinally extending plate, whereby said latch means may be moved to engage said hinge means and press it against said longitudinally extending plate for connecting said drive means to said door panel or to remove said connection.

5. An end gate according to claim 4 in which said hinge means includes a first portion on one side of the hinge connected to said door panel and a second portion movable about said hinge;
 said movable portion being L-shaped whereby its means adjacent to said hinge fits against said longitudinally extending member and its distal portion fits against said drive means.

6. An end gate according to claim 5 in which at least one portion of said distal means is bent outwardly to form a finger grip.

7. An end gate means in accordance with claim 1 in which said drive means is a longitudinally extending plate having latch means movable between a raised unlatched position and a downwardly extending latched position into close engagement with locking means on said panels;
 said corresponding locking means on said door panels being hinge means movable from a location over said longitudinally extending plate and away from said longitudinally extending plate, whereby said latch means may be moved to engage said hinge means and press it against said longitudinally extending plate for connecting said drive means to said door panel or to remove said connection.

8. An end gate according to claim 7 in which said hinge means includes a first portion on one side of the hinge connected to said door panel and a second portion movable about said hinge;

said movable portion being L-shaped whereby its portion adjacent to said hinge fits against said longitudinally extending member and its distal means fits against said drive means.

9. An end gate according to claim 8 in which at least one portion of said distal means is bent outwardly to form a finger grip.

* * * * *